United States Patent

Robert et al.

[11] Patent Number: 5,566,781
[45] Date of Patent: Oct. 22, 1996

[54] APPARATUS AND METHODS FOR FLUSHING AND CLEANING OIL STRAINER, CRANKCASE AND OTHER COMPONENTS OF AN INTERNAL COMBUSTION ENGINE

[76] Inventors: Jimmie H. Robert, 15938 Singapore, Houston, Tex. 77040; Eddie L. Robert, 13926 Cedar Point, Houston, Tex. 77070

[21] Appl. No.: 428,373

[22] Filed: Apr. 25, 1995

[51] Int. Cl.$^6$ .................................................. F16N 33/00
[52] U.S. Cl. .............................. 184/1.5; 184/54; 184/57; 123/196 A; 141/65; 141/67; 141/98; 134/169 A; 134/22.12; 134/26; 134/37
[58] Field of Search .............. 184/1.5, 54, 55.1, 184/57, 105.1, 6.24; 123/196 R, 196 A; 141/65, 67, 98; 134/166 R, 169 A, 102.1, 22.18, 22.12, 26, 37, 39, 40, 22.14, 22.19; 15/304

[56] References Cited

U.S. PATENT DOCUMENTS

| | | | |
|---|---|---|---|
| 2,554,389 | 5/1951 | Stevens | 184/1.5 |
| 4,128,140 | 12/1978 | Riches | 184/1.5 |
| 4,174,231 | 11/1979 | Hobgood | 134/39 |
| 4,951,784 | 8/1990 | Bedi | 184/1.5 |
| 5,190,120 | 3/1993 | Watts | 184/1.5 |

*Primary Examiner*—Edward K. Look
*Assistant Examiner*—Christopher Verdier
*Attorney, Agent, or Firm*—Bill B. Berryhill

[57] ABSTRACT

Apparatus and methods for flushing and cleaning the oil strainer and crankcase of an internal combustion engine of a type having a removable full-flow oil filter. The oil filter is temporarily replaced with a cartridge which has at least one passage therethrough which will communicate with the discharge side of the engine oil pump but does not communicate with the normal outflow port of the filter apparatus. A second passage therethrough may communicate with the outflow port of the filter system but does not communicate with the discharge of the oil pump. In a preferred method, the inlet of the first passage may be connected to a source of pressurized fluid to force the fluid, in a direction opposite to normal flow, through the passage, the oil pump and the oil strainer to agitate and flush contaminants in the oil strainer and crankcase. The pressurized fluid and contaminants are drained from the crankcase after which the cartridge is removed, a new oil filter installed and clean oil added to the engine.

17 Claims, 2 Drawing Sheets

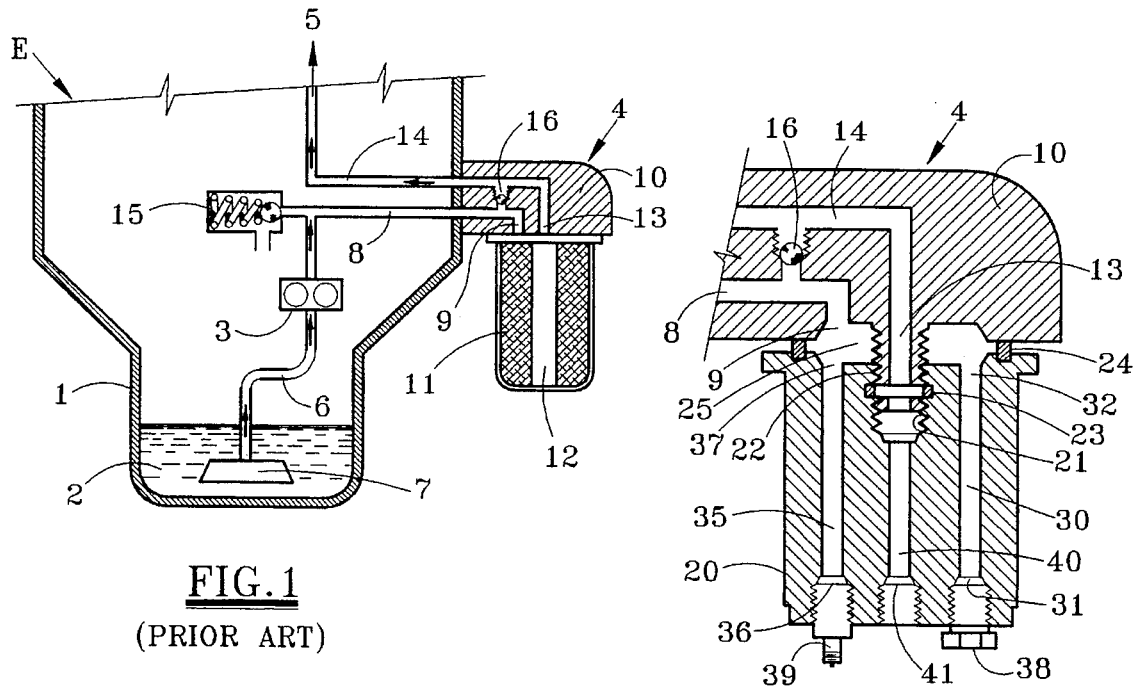
FIG.1 (PRIOR ART)
FIG.2
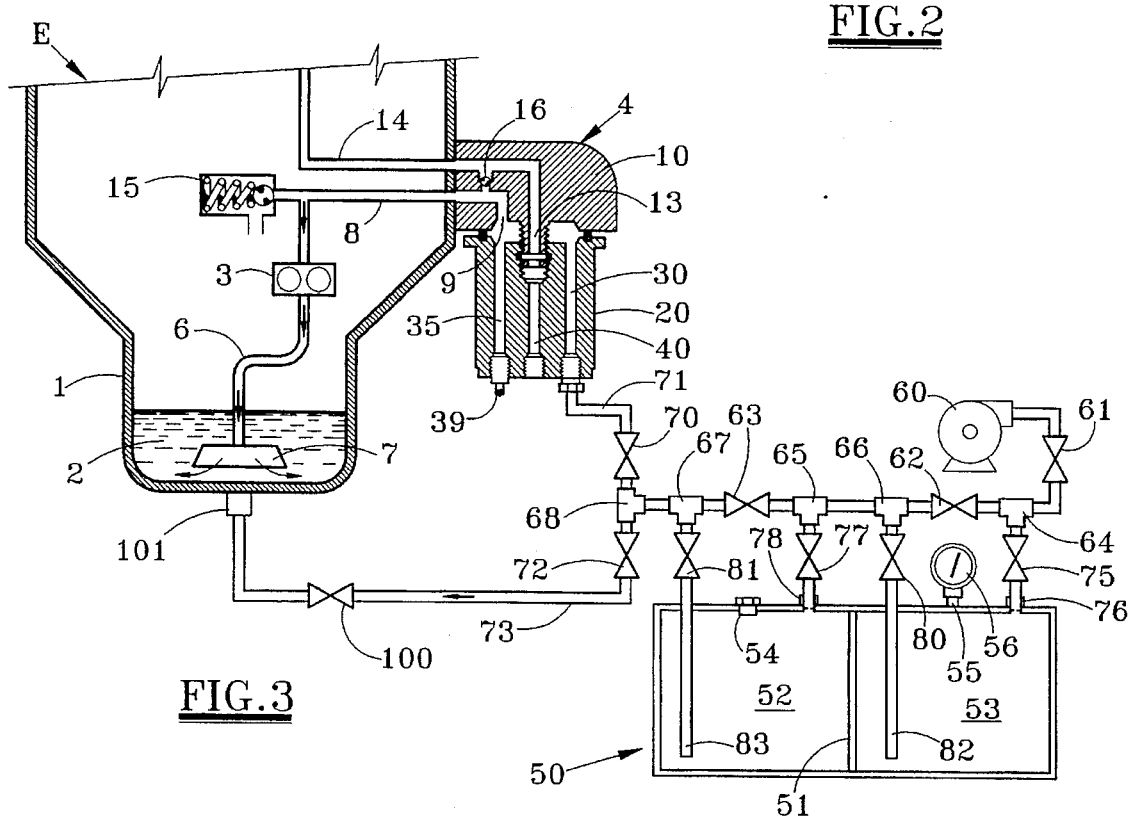
FIG.3

5,566,781

APPARATUS AND METHODS FOR FLUSHING AND CLEANING OIL STRAINER, CRANKCASE AND OTHER COMPONENTS OF AN INTERNAL COMBUSTION ENGINE

BACKGROUND OF THE INVENTION

1. Field of the Invention

The present invention pertains to internal combustion engines and lubricating systems thereof. More specifically, the present invention pertains to apparatus and methods for flushing and cleaning components of an internal combustion engine of the type having a removable spin-on oil filter.

2. Description of the Prior Art

Most four cycle, internal combustion engines, particularly those in automobiles, are lubricated by a wet sump system, i.e. the engine's lubricating oil is contained in the engine crankcase (oil pan). In such engines, an oil pump, typically a gear type or a vane type, is provided in the sump for pumping oil from the sump to the oil distribution system for the moving parts of the engine. Typically, the suction side of the oil pump is connected to an oil strainer or screen to prevent particulates from entering the pump and being forced through the oil distribution system. Such particulates are usually in the form of sludge and may be a mixture of road dust, water, carbon, oil, etc. The sludge is generally dark in appearance and gummy in consistency. If an engine does not run frequently, sludge may be hardened, difficult to dissolve and remove, even if oil is changed frequently. The sludge may accumulate restricting oil flow to the moving parts of the engine. Of course restricted oil flow may result in damage to the engine parts.

To assist in further filtering of oil distributed to an engine, most engines are provided with some type of filter system. Early filter systems were of the "bypass" or "part-flow" type. In a bypass system, oil, after flowing through the oil strainer, is forced under pressure by the oil pump to the gallery or main oil distribution system. Approximately 90% of the oil is pumped directly to engine bearings and other moving parts before it drains back to the oil pan. Only 10% of the oil is diverted into a filter housing where it is cleaned by a filter cartridge before being returned to the sump. Thus, a bypass filter filters only 10% of the oil on a complete circulation cycle.

In the 1950's a better oil filtration system, called the "full-flow" filter system was developed. In the full-flow filter system, oil flows through the oil strainer, to catch large particles of contaminant, then is forced under pressure by the oil pump to the oil distribution system. However, before being distributed to engine parts, all of the oil must pass through the full-flow filter element. Since the filter element could become "plugged" with contaminants, preventing sufficient flow of oil to the engine, a relief or bypass valve may be provided in the filter system to provide normal flow of oil, even though unfiltered, to the engine. The typical full-flow filter element is a "spin-on" type which may be easily removed and replaced with a clean filter on a regular maintenance schedule.

Obviously, the oil strainer through which oil is drawn into the oil pump is critical to the lubrication system of an internal combustion engine. If the oil strainer becomes clogged, particularly after many hours of operation, the flow of oil to the oil distribution system of an engine may be severely restricted resulting in unnecessary wear and eventual failure of an engine. Keeping the crankcase and oil strainer clean would obviously prolong the life of an engine and the automobiles in which they are installed.

In the past, several methods have been devised to clean the crankcase, sump area and oil screen. In one method, used oil is drained, a cleaning agent, such as a lightweight oil or paraffin oil, is placed in the sump and the engine is operated long enough to warm and circulate the cleaning oils through the engine. Then the cleaning agent is removed and the engine refilled with the proper grade oil. This method is frowned on by engine manufacturers and flushes only a small percentage of the contaminants and sludge. In another method, the used oil is drained, the oil pan removed, the crankcase cleaned, the oil screen cleaned or replaced and the engine refilled with clean oil. Obviously, this method is fairly effective however it is relatively expensive and not conducive to ordinary day to day maintenance.

Obviously, better methods of cleaning and flushing the crankcase of an engine have been sought. In U.S. Pat. No. 4,174,231 the crankcase is drained and the spin-on oil filter is removed and replaced with an adapter which is hollow. The crank case is filled with a cleaning and flushing fluid and the engine operated to circulate the fluid through the engine and through the filter fitting and adapter without filtration. The crankcase is then drained, the adapter removed and replaced with a clean oil filter cartridge. Obviously, this forces cleaning fluid and contaminants entrained therewith through the lubricating system of the engine and while it may somewhat clean the crankcase and oil strainer, there is the potential of substantial damage to the engine from contaminants forced through the moving parts.

In U.S. Pat. No. 4,854,277 a blocking device is placed on the upper end of a spin-on oil filter preventing flow of fluid from the oil pump through the filter. Spent oil is drained from the crankcase, flushing fluid is placed therein and the engine operated causing the flushing fluid to pass to the filter cartridge. However, since the filter cartridge is blocked, the internal filter bypass valve opens so that the flushing liquid bypasses the filter cartridge and circulates through the engine. The crankcase is then drained of flushing liquid and a new filter cartridge put in place. This method has the same problems associated with the method of U.S. Pat. No. 4,174,231.

A high speed oil change and/or flushing method in which an additional filter element is required is shown in U.S. Pat. No's 5,044,334 and 5,209,198. These methods require additional filter apparatus and like in the previously described patents, force cleaning fluids directly to the lubrication distribution system of an engine.

Due to the high cost of purchasing and operating today's automobiles, most vehicle owners desire longer life and more trouble-free operation of their vehicles. They also want to avoid costly repairs thereto. For these reasons, owners and operators of internal combustion engines should gratefully receive new methods and apparatus for flushing and cleaning the oil strainer and crankcase of an internal combustion engine to prolong its life and reduce the cost of maintenance thereof.

SUMMARY OF THE PRESENT INVENTION

The present invention provides apparatus and methods for flushing and cleaning the oil strainer and crankcase of an internal combustion engine of a type having a removable spin-on, full-flow oil filter. In methods of the present invention the spin-on oil filter is temporarily replaced with a spin-on cartridge which has at least one passage therethrough which will communicate with the discharge side of the engine oil pump but does not communicate with the normal outflow port of the filter apparatus. The cartridge may also have a second passage therethrough which communicates with the outflow port of the filter system but does not communicate with the discharge of the oil pump.

In a preferred method of the present invention, the inlet of the first passage may be connected to a source of pressurized fluid to force the fluid, in a direction opposite to normal flow, through the passage, the oil pump and the oil strainer to agitate and flush contaminants in the oil strainer and crankcase. The pressurized fluid and contaminants are drained from the crankcase after which the cartridge is removed, a new oil filter installed and clean oil added to the engine. In this method, the pressurized fluid may be air, cleaning fluid or a combination of air and cleaning fluid.

In another preferred method of the present invention, and after cleaning and flushing of the oil strainer and crankcase, a source of pressurized oil may be connected to the inlet of the second passage forcing pressurized oil through the filter system outflow port and the oil distribution system of the engine to flush used oil therefrom. The used oil is then drained from the crankcase, the cartridge removed, a new oil filter installed and clean oil added to the engine. The pressurized oil may also be entrained in air to obtain surging and agitation through the oil distribution system.

Thus, the apparatus and method of the present invention provides a unique method of reverse flushing of the oil strainer and crankcase of an internal combustion engine which is much more effective in removing contaminants, particularly from the oil strainer, than prior art methods in which flushing fluids circulate in the same direction as normal oil flow. In addition, the present invention provides a means of flushing or cleaning old oil from the oil distribution system with clean oil. Both the flushing of the oil strainer and crankcase and flushing of old oil from moving engine parts are done without forcing contaminated cleaning fluids through the oil distribution system and the moving parts of the engine.

The apparatus and method of the present invention should add many hours of operation and life to internal combustion engines and the vehicles in which they are installed. Many other objects and advantages of the apparatus and method of present invention will be apparent from reading the description which follows in conjunction with the accompanying drawings.

BRIEFER DESCRIPTION OF THE DRAWINGS

FIG. 1 is a cross-sectioned schematic representation of the crankcase and spin-on, full-flow oil filter system of an internal combustion engine of the prior art;

FIG. 2 is a longitudinal cross-sectional view of a special cartridge for temporarily replacing a spin-on, full-flow oil filter to flush and clean the crankcase, oil strainer and other components of an internal combustion engine, according to a preferred embodiment of the invention;

FIG. 3 is a schematic representation of an internal combustion engine to which the special cartridge of FIG. 2 has been attached in combination with additional apparatus for flushing and cleaning the crankcase, oil strainer and other components of an internal combustion engine according to preferred methods of the present invention;

DESCRIPTION OF PREFERRED EMBODIMENT OF THE INVENTION

Figure 4:
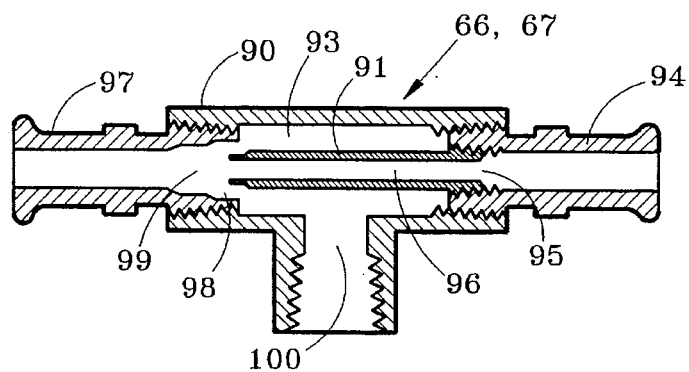
FIG. 4 is a longitudinal view, in section, of fluid eductor apparatus for use in apparatus and methods of the present invention.

Referring first to FIG. 1 there is shown, in section, the lower portion of an internal combustion engine E having a crankcase 1 in the lower portion of which is an oil sump 2. Oil is pumped from the sump 2 by an oil pump 3, through a filter system 4, to the main oil gallery or oil distribution system 5 of the engine. The suction side of the oil pump 3 is connected through suction piping 6 to an oil strainer 7. The oil strainer or screen 7 strains or blocks passage of particulate contaminants through the oil pump and the filter system 4. The discharge side of the oil pump 3 is connected by discharge piping 8 to an oil filter inflow port 9 situated in an oil filter boss 10 to which a spin-on type oil filter 11 is attached. Oil typically flows through a filter element in the annular filter area of the oil filter 11 into a central passage 12 from which the filtered oil passes through an outflow port 13 and piping 14 to the main oil gallery or oil distribution system of the engine E.

The discharge piping 8 from the oil pump 3 may also be connected to a pressure regulating valve 15 which regulates pressure to the inflow side of the oil filter 11. This pressure, typically 40 to 60 psi for automobiles, is usually set by the manufacturer. If the pressure exceeds the predetermined pressure, the pressure regulating valve 15 will open, bypassing or dumping part of the oil back to the oil sump 2. In addition, the filter 11 system 4 may be provided with an internal relief or bypass valve 16, as previously discussed so that if the pressure filter becomes plugged, the filter may be bypassed and normal flow of oil discharged into the piping 14, without being filtered.

The oil strainer 7 is a major part of the lubrication system of the internal combustion engine E. If the strainer 7 is plugged by sludge, etc., insufficient amounts of oil may be supplied to the moving engine parts. Some strainers are provided with bypasses so that if they become plugged, the bypass will open allowing the oil to flow therethrough. However, the oil passing through the bypass is not strained and harmful solids may then be pumped by the oil pump and forced through the lubrication system, either clogging the oil filter 11 or bypassing the oil filter and being pumped to the moving parts of the engine. Either situation is harmful. For this reason, it is important to keep the oil strainer 7 and the crankcase 2 as clean as possible.

In FIG. 2, the oil filter system 4 and oil filter boss 10 is illustrated. However, the spin-on type oil filter 11 has been removed and replaced with a special reverse flush cartridge 20 which forms a portion of the present invention. The cartridge 20 is preferably cylindrical in shape and has the general appearance of a spin-on type oil filter. It would be provided with a central threaded hole 21 threadedly engageable with a threaded pipe portion 22 which normally depends downwardly from the filter boss 10 to which spin-on type oil filters are typically attached. The pipe 22 provides an outflow port 13 in communication with the oil distribution system of the moving parts of the engine E through the piping 14. An annular seal 23 around this threaded connection and an annular seal 24 around the upper periphery of the cartridge 20 seals the cartridge 20 to the filter boss 10 as it is threadedly connected to the pipe 22 by twisting or rotating the cylinder 20. Hand tightening should be sufficient to provide an adequate seal. An annular recessed area 25 surrounding the threaded pipe 22 is in fluid communication with inflow port 9 and piping 8 which is connected to the discharge of oil pump 3 (see FIG. 1).

The special reverse flush cartridge 20 has at least one passage 30 therethrough having an inlet 31 and an outlet 32 which communicates with inflow port 9 but does not communicate with outflow port 13. In the exemplary embodiment of FIG. 2, there is also another passage 35 therethrough which has an inlet 36 and an outlet 37 which may also communicate with the inflow port 9 and discharge piping 8 but does not communicate with outflow port 13. As shown in FIG. 2, the inlet 31 may be temporarily closed by a removable plug 38. Inlet 36 is shown with an air valve stem 39.

As also shown in FIG. 2, the cartridge 20 is provided with a central passage 40 having an inlet 41 and an outlet 42 which communicates with the outflow port 13 but is prevented from communicating with inflow port 9. In alternate embodiments of the invention, the cartridge 20 may not be provided with the central passage 40 or one of the other passages 30, 35.

Referring now to FIG. 3, there is illustrated the engine E of FIG. 1 but showing the spin-on type oil filter 11 temporarily removed and replaced by a reverse flush cartridge 20 such as the one shown in FIG. 2. As shown in FIG. 3, at least one of the cartridge passages 30, 35 is connected, by various pipe fittings, to other apparatus for use in the present invention. This apparatus may comprise a fluid container 50 divided by a dividing wall 51 into two compartments, an oil chamber 52 and a cleaning fluid chamber 53. These chambers may be filled through filler plugs 54 and 55, filler plug 55 being shown with a pressure gauge 56 attached thereto. The discharge side of a compressor 60 is attached by various intervening piping components, valves 61, 62, 63, tees 64, 65 and vacuum eductors 66, 67 to a tee fitting 68. One branch of the tee 68 may be connected through valve 70 and piping 71 to the inlet of cartridge passage 30. The other branch of the tee 68 is connected through valve 72 and piping 73 to the inlet of central passage 40 or, as shown in FIG. 3, to another valve 100 attached to oil pan surge and agitation apparatus 101, described more fully hereafter.

Figure 5:
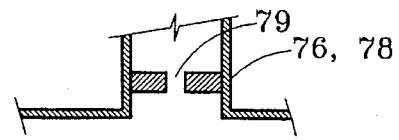
FIG. 5 is an elevation view, in section, of orifice apparatus which may be used in apparatus and methods of the present invention.

The tee 64 is connected through valve 75 and orifice 76 to the cleaning fluid chamber 53. The tee 65 is connected through valve 77 and orifice 78 to oil chamber 52. The orifices 76, 78, illustrated in FIG. 5, are simply fittings provided with small passages 79 for metering small amounts of air into the chambers 53 and 52 as needed.

The fluid eductors 66, 67 are connected through valves 80, 81 to pipes 82, 83 the lower opened ends of which are near the bottom of chambers 53, 52 respectively. FIG. 4 illustrates a fluid eductor such as 66 or 67. In the exemplary embodiment the eductors 66, 67 have an outer tubular tee body 90 surrounding an inner tubular member 91 providing an annular space 93 therebetween. A tubular inlet fitting 94 is threadedly connected to the body 90 and the inner tube 91 and has an inlet port 95 which communicates with the passage 96 through the inner tube 91. An outlet fitting 97 is threadedly connected to the other end of the tubular body 90 but machined to leave an annular passage 98 from the annular space 93 into the outlet port 99. If air is forced through the inlet port 95 passage, 96 and outlet port 99 a vacuum is created in the annular passage 98. If a side port 100 is provided for a connection to a source of fluid, such as through the valves and piping 80, 82 and 81, 83 of FIG. 3, any fluids forced into the side port 100 will be induced, by the vacuum in the annular passage 98 through the annular passage 98 and port 99 to be entrained with air passing through outlets port 99.

The apparatus of the present invention may be utilized in several methods. In the first one to be discussed, it may be utilized as a simple preventative maintenance procedure which may be quickly performed with only the special reverse flush cartridge 20 as in FIG. 2. In this procedure, the engine E is operated until normal operating temperature is achieved, reducing viscosity of the oil. Then the oil filler plug (not shown) is removed from the top of the engine to prevent any internal pressure build up in the engine during the maintenance procedure. This step is essential. The spin-on type oil filter 11 is removed and replaced with the reverse flush cartridge 20 of FIG. 2. As previously indicated, the reverse flush cartridge 20 seals on the same surfaces as the spin-on type oil filter.

At this point, air valve stem 39 may be placed in the inlet 31 or 36 of one of the passages 30, 35. The other inlet 31, is preferably plugged with a plug, such as plug 38. Then regulated air, e.g. 40 psi, is introduced into the flow passage 35 directly from an air compressor for two to five minutes. The air is preferably filtered. The air introduced through the passages 35 enters the inflow port 9 and is forced in a direction opposite normal flow (reverse flow) through piping 8, oil pump 3, piping 6 and the strainer 7 reverse flushing the strainer and agitating and dislodging sludge and contaminants blocking the strainer and collected in the bottom of the crankcase. The air pressure is then reduced and the used contaminated oil in the crankcase is drained therefrom. Then the reverse flush cartridge 20 is removed, a new oil filter attached and clean oil added to the engine. This is a very quick and economical preventative maintenance procedure which prolongs the life of the engine and may prevent costly engine repair.

If the just described procedure indicates incomplete cleaning or if the operator wishes to perform a more complete cleaning and flushing operation, he may proceed with the method described hereafter prior to removing the reverse flush cartridge 20. The more complete procedure described hereafter will be described with reference to FIG. 3. This procedure begins with all of the valves 61, 62, 63, 70, 72, 75, 77, 80, 81 and 100 closed. The piping 71 is connected, preferably with a quick disconnect device, to the inlet of passage 30. The piping 73 may be connected through valve 100 to the oil pan surge and agitation apparatus 101. The passage 35 in this case may be used for direct air connection as in the previously described procedure or it may be plugged by a plug such as 38 in FIG. 2. Then air compressor 60 may be operated to produce filtered and regulated air, e.g. at 20 psi. Valves 61, 62, 63 and 70 are then opened to insure air communication between the air compressor 60, passage 30, piping 8, oil pump 3, piping 6, oil strainer 7 and the crankcase 2.

Air pressure may then be increased to, e.g. 20 psi, and valves 75 and 80 opened. Opening the valve 75 allows air to pass through the orifice 76 into the cleaning fluid chamber 53 forcing cleaning fluid from the chamber upwardly through pipe 82 and valve 80 into the eductor 66. The vacuum created by air passing through the eductor 66 induces cleaning fluid into the air stream creating a surging of air and cleaning fluid through passage 30 and, in a reverse flow direction, through the piping 8, oil pump 3, piping 6 and oil strainer 7 into the crankcase or oil sump 2. The regulator valve 15 is also flushed. If desired, valve 62 may be closed increasing the flow of cleaning fluid from the chamber 53. A typical injection or reverse flush time may be five minutes.

Figure 6:
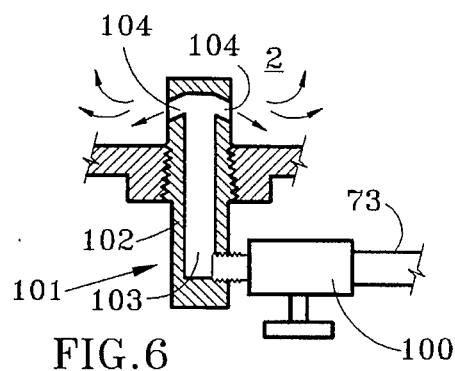
FIG. 6 is an elevation view, partially in section of oil pan surge and agitation apparatus which may be used in methods of the present invention.

If desired, valve 70 may be closed, valves 72 and 100 opened, allowing air and cleaning fluid to be directed through the oil pan surge and agitation apparatus 101. As best seen in FIG. 6, the oil pan surge and agitation apparatus 101 may comprise a tubular member 102 threaded to replace the oil drain plug( not shown) at the bottom of the crankcase 1. The tubular member has a central passage 103 which is connected at its lower end to valve 100. The central passage 103 does not communicate directly with the crankcase 1. However a plurality of reverse angle radial ports 104 provide indirect communication. If air or air and cleaning fluids are directed to the central passage 103, through valve 100, it is directed at downwardly directed angles through radial ports 104, surging, agitating and dislodging contaminants in the crankcase sump 2.

After the cleaning fluid is forced from the chamber 53, valve 75 and 80 may be closed, valve 62 opened and air only may be reverse flushed through the piping 8, oil pump 3, piping 6, strainer 7 and crankcase 1, if desired. The air pressure may be increased to for example, 40 psi. Then valve 100 is closed first. Valves 72 and 61 are closed and valves 75 and 80 opened to bleed pressure from chamber 53. Valves 75 and 80 are closed again.

After the oil strainer 7 and crankcase 2 have been flushed, air pressure is reduced, oil pan surge and agitation apparatus 101, removed, and the cleaning fluid and any sludge and contaminants therein are drained from the sump 2. By opening valve 61, this may be accomplished under pressure, e.g. 20 psi while valves 75, 80, 77, 81 and 72 remain closed.

With the oil pan drain plug still removed, valves 77 and 81 are opened. Valve 77 pressurizing the oil compartment 52 through orifice 78 and forcing lubricating oil therefrom up piping 83 through valve 81 into the eductor 67, creating a surging action of air and clean oil through the passage 30 of the reverse flow cartridge 20, reverse flushing oil pump 3 and the oil strainer 7 to lubricate all the areas thereof. Valve 63 may be closed to decrease the time of injection.

Figure 7:
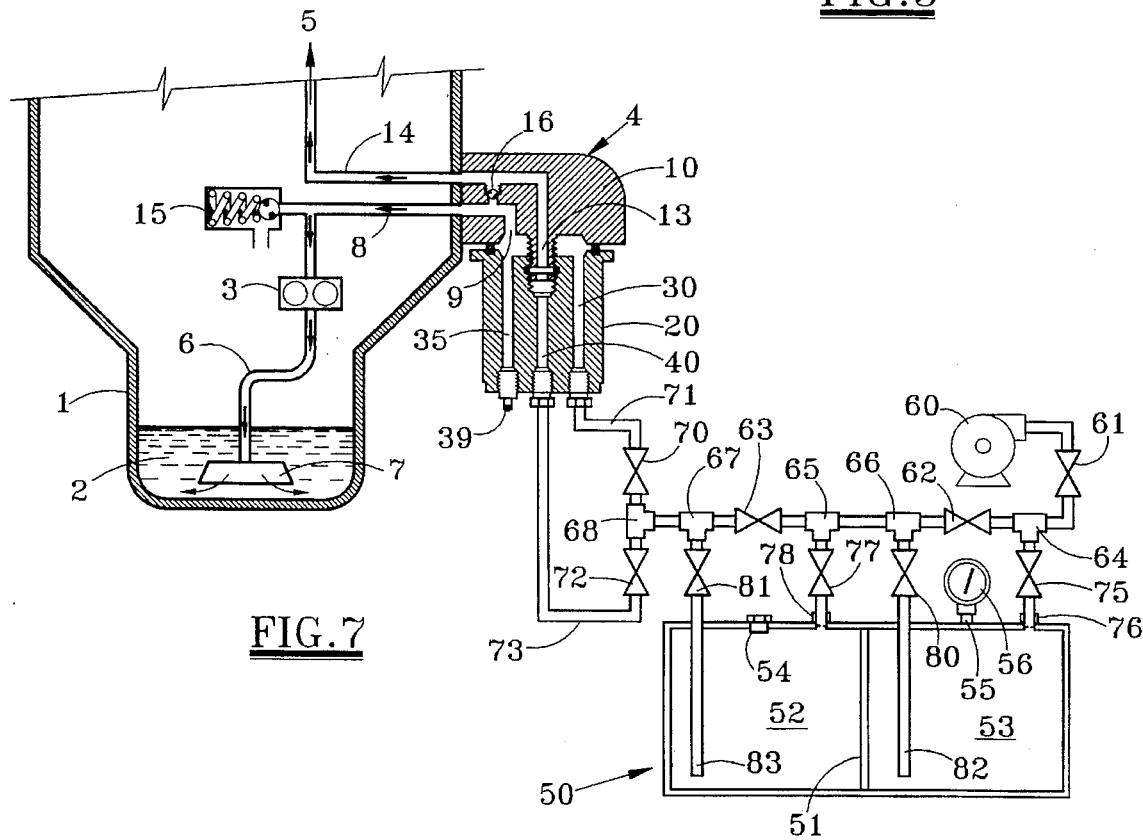
FIG. 7 is a schematic representation of an engine and flushing and cleaning apparatus, similar to that in FIG. 3, illustrating additional steps in preferred methods of the present invention.

With the oil pan surge and agitation apparatus 101 and valve 100 disconnected, piping 73, with valve 72, is then connected to central passage 40, as in FIG. 7. Then valve 70 may be closed and valve 72 opened allowing air and clean oil from the oil chamber 52 to be forced through piping 73 and the central passage 40, outflow port 13 and piping 14 to the main oil gallery and lubrication distribution system 5 of the engine. This displaces and flushes used oil from the moving parts by new oil. The used oil drains into the sump 2 and out of the oil pan through the opened drain outlet. Draining continues until clean new oil is visually observed.

Next the valve 61 is closed to allow air pressure in the oil chamber 52 to be reduced to 0 psi. Then valves 81 and 77 are closed. At this point, the piping 71 and 73 may be disconnected from the reverse flush cartridge 20.

The reverse flush cartridge 20 is then removed and replaced with a new oil filter. The oil pan drain plug is installed, new oil is added to the engine and the oil filler inlet is closed. If desired the new oil filter may be removed after a few hours of operation and replaced with another new filter. This assures complete removal of any small contaminants which may have been dislodged during the few hours of operation after flushing and cleaning.

Most present day filters are of the "spin-on" type. However, the invention is not so limited. The cartridge 20 of FIG. 2 may be adapted for replacement of other types of filters such as those which are placed in a housing provided therefor or attached in any other suitable manner.

Thus, the apparatus and method of the present invention provide unique reverse flushing and cleaning of the oil pump, oil strainer and crankcase of an internal combustion engine. While several apparatus and methods have been described herein, many variations thereof can be made without departing from the spirit of the invention. Therefore, it is intended that the scope of the invention be limited only by the claims which follow.

We claim:

1. An apparatus for flushing and cleaning an internal combustion engine of the type having a crankcase, an oil pump, an oil strainer an oil distribution system for moving parts of said engine and a removable full-flow oil filter, inflow areas of which are connected through an inflow port to a discharge of said oil pump, a suction side of said oil pump being connected, through said oil strainer, to said crankcase, outflow areas of said oil filter being in fluid communication, through an outflow port, with said oil distribution system for said moving parts of said engine, said apparatus comprising a reverse flush cartridge for temporary replacement of said filter, said cartridge having first and second passages therethrough, said first passage having an outlet, which communicates with said inflow port but does not communicate with said outflow port, and an inlet connectable to a source of pressurized fluid whereby said pressurized fluid may be forced through said first passage, said inflow port, said oil pump and said oil strainer, in a direction opposite of normal flow through said strainer, to flush and clean said oil strainer and crankcase, said second passage having an outlet, which communicates with said outflow port but does not communicate with said inflow port, and an inlet connectable to a source of pressurized fluid whereby said pressurized fluid may be forced through said second passage and said outflow port to said oil distribution system.

2. The flushing and cleaning apparatus as set forth in claim 1 in which said cartridge has a third passage therethrough having an outlet which communicates with said inflow port but does not communicate with said outflow port, said third passage having an inlet connectable to a source of pressurized fluid whereby said pressurized fluid may be forced through said third passage, said inflow port, said oil pump and said oil strainer, in a direction opposite of said normal flow through said strainer.

3. The flushing and cleaning apparatus as set forth in claim 1, including a container of fluid connected by a fluid conduit to at least one of said first and second passage inlets and means connected to said fluid container for pressurizing and forcing fluid from said container through said fluid conduit to said at least one of said first and second passage inlets.

4. The flushing and cleaning apparatus as set forth in claim 3 in which said fluid in said container is liquid, said pressurizing means comprising an air compressor.

5. The flushing and cleaning apparatus as set forth in claim 4 in which said pressurizing means comprises eductor means connected to said air compressor and said container to discharge surges of air and liquid into said fluid conduit.

6. The flushing and cleaning apparatus as set forth in claim 1 including containers of fluid connected by fluid conduits to the inlets of said first and second passages and means connected to said fluid containers for pressurizing and forcing fluids therefrom through said fluid conduits to said first and second passage inlets.

7. The flushing and cleaning apparatus as set forth in claim 6 in which said containers include a container of oil and a container of cleaning fluid, said fluid conduits being provided with valves which are selectively operable to alternately direct cleaning fluid said first passage inlet or oil to said second passage inlet.

8. The flushing and cleaning apparatus as set forth in claim 7 in which said pressurizing means comprises an air compressor, a discharge of which may be connected to either of said oil or cleaning fluid containers.

9. The flushing and cleaning apparatus as set forth in claim 8 including eductor means connected to said air compressor and at least one of said containers to discharge surges of air and fluid into said fluid conduits.

10. A method of flushing and cleaning a crankcase, an oil strainer and components of an internal combustion engine of the type having a removable full flow oil filter, inflow areas of which are connected through an inflow port to a discharge of an oil pump and a suction side of which is connected, through said oil strainer, to said crankcase, outflow areas of said oil filter being in fluid communication, through an outflow port, with an oil distribution system of moving parts of said engine, said method comprising the steps of:

1) removing an oil filler plug of said engine;
2) removing said oil filter;
3) replacing said oil filter with a reverse flush cartridge having at least one passage therethrough having an inlet and an outlet and which communicates with said inflow port but does not communicate with said outflow port;
4) connecting a source of pressurized air to said cartridge passage inlet forcing said air through said passage, said inflow port, said oil pump and said oil strainer, in a direction opposite of normal flow through said strainer, to agitate and flush contaminants in said oil strainer and said crankcase;
5) draining the used oil and contaminants from said crankcase;
6) removing said cartridge;
7) installing a new oil filter; and
8) adding clean oil to said engine.

11. The a method of flushing and cleaning an engine as set forth in claim 10 including, after step 5) but prior to step 6), the additional steps of:

a) connecting a source of pressurized cleaning fluid to said cartridge passage inlet, forcing cleaning fluid in a direction opposite normal flow, through said passage, said inflow port, said oil pump and said oil strainer to clean said oil strainer; and
b) draining said cleaning fluid from said crankcase.

12. The method of flushing and cleaning an engine as set forth in claim 11 in which said cleaning fluid is pressurized and entrained with air to surge and agitate through said oil strainer and said crankcase.

13. The method of flushing and cleaning an engine as set forth in claim 11 and in which said cartridge has another passage therethrough having an inlet and an outlet which communicates with said outflow port but does not communicate with said inflow port, said method including the additional steps of:

c) disconnecting said source of cleaning fluid from said first-mentioned passage outlet;
d) connecting a source of pressurized oil to said another passage inlet forcing said pressurized oil through said outflow port and the oil distribution system of said engine to flush used oil therefrom; and
e) draining said used oil from said crankcase.

14. The method of flushing and cleaning an engine as set forth in claim 13 in which said oil is pressurized and entrained with air to surge and agitate through said oil distribution system.

15. A method of flushing and cleaning a crankcase, an oil strainer and components of an internal combustion engine of the type having a removable oil filter, inflow areas of which are connected through an inflow port to a discharge of an oil pump and a suction side of which is connected, through said oil strainer, to said crankcase, outflow areas of said oil filter being in fluid communication, through an outflow port, with an oil distribution system of moving parts of said engine, said method comprising the steps of:

1) removing an oil filler plug of said engine;
2) draining used oil from said crankcase;
3) removing said oil filter;
4) replacing said oil filter with a reverse flush cartridge having first and second passages therethrough, said first passage having an inlet and an outlet which communicate with said inflow port but do not communicate with said outflow port, said second passage having an inlet and outlet which communicate with said outflow port but do not communicate with said inlet port;
5) connecting a source of pressurized cleaning fluid to said first cartridge passage inlet forcing said cleaning fluid, in a direction opposite of normal flow, through said first passage, said inflow port, said oil pump and said oil strainer to flush and clean said oil strainer and said crankcase;
6) draining said cleaning fluid and contaminants cleaned thereby from said crankcase;
7) disconnecting said source of cleaning fluid from said first passage inlet;
8) connecting a source of pressurized oil to said second passage inlet forcing said pressurized oil through said outflow port and the oil distribution system of said engine to flush said oil therefrom;
9 removing said cartridge;
10 installing a new oil filter; and
11 adding clean oil to said engine.

16. The method of flushing and cleaning an engine as set forth in claim 15 in which said cleaning fluid is pressurized and entrained with air to surge and agitate through said oil strainer and said crankcase.

17. The method of flushing and cleaning an engine as set forth in claim 15 in which said oil is pressurized and entrained with air to surge and agitate through said oil distribution system.

* * * * *